US011262450B1

(12) United States Patent
Obenberger et al.

(10) Patent No.: US 11,262,450 B1
(45) Date of Patent: Mar. 1, 2022

(54) RECEIVE ONLY IONOSONDE USING BROADBAND EMISSIONS AS SIGNALS OF OPPORTUNITY

(71) Applicant: Government of the United States, as represented by the Secretary of the Air Force, Kirtland AFB, NM (US)

(72) Inventors: Kenneth S. Obenberger, Albuquerque, NM (US); Richard T. Parris, Albuquerque, NM (US); Todd R. Pedersen, Albuquerque, NM (US)

(73) Assignee: Government of the United States, as Represented by the Secretary of the Air Force, Kirtland AFB, NM (US)

( * ) Notice: Subject to any disclaimer, the term of this patent is extended or adjusted under 35 U.S.C. 154(b) by 230 days.

(21) Appl. No.: 16/144,511

(22) Filed: Sep. 27, 2018

Related U.S. Application Data

(60) Provisional application No. 62/669,701, filed on May 10, 2018.

(51) Int. Cl.
  *G01S 13/95* (2006.01)
(52) U.S. Cl.
  CPC .......... *G01S 13/951* (2013.01); *G01S 13/958* (2013.01)
(58) Field of Classification Search
  CPC .............................. G01S 13/951; G01S 13/958
  See application file for complete search history.

(56) References Cited

U.S. PATENT DOCUMENTS

| 4,463,357 | A | * | 7/1984 | MacDoran | G01S 3/023 342/460 |
| 4,972,195 | A | * | 11/1990 | Markson | G01S 11/02 342/453 |
| 5,428,358 | A | * | 6/1995 | Gardner | G01S 5/14 342/26 D |
| 5,943,629 | A | * | 8/1999 | Ballard | H04B 7/18519 702/2 |
| 2003/0078731 | A1 | * | 4/2003 | Nakamura | G01S 13/951 702/2 |

(Continued)

FOREIGN PATENT DOCUMENTS

WO    WO-2013152120 A2 * 10/2013  ........... C12Y 301/00

OTHER PUBLICATIONS

Proctor, D.E., "VHF radio pictures of cloud flashes," Fournal of Geophysical Research, vol. 86, Issue C5, May 20, 1981, p. 4041-4071.

(Continued)

*Primary Examiner* — Marcus E Windrich
(74) *Attorney, Agent, or Firm* — AFNWC/JA; David L. Narciso (57) ABSTRACT

A system, computer program product and method of examining the ionosphere is disclosed. The method includes capturing, at one or more antennas, radio frequency (RF) emissions preceding a broadband emission event. The RF emissions are then recorded at one or more broadband receivers over a period of time. A first tuning of the received RF emissions is selected to detect ionospheric reflections, and a second tuning of the received RF emissions is selected to detect direct line of sight emissions. From the selected tunings, an amplitude or complex time series of the second tuning with one or more channels of the first tuning are correlated to calculate a relative virtual echo height of the ionosphere.

22 Claims, 4 Drawing Sheets

(56) References Cited

U.S. PATENT DOCUMENTS

| | | | | |
|---|---|---|---|---|
| 2006/0229813 A1* | 10/2006 | Tobiska | ............ | G01W 1/10 702/2 |
| 2008/0143571 A1* | 6/2008 | Sojka | ............ | G01S 13/951 341/144 |
| 2013/0285847 A1* | 10/2013 | Ward | ............ | H01Q 21/08 342/90 |
| 2015/0134250 A1* | 5/2015 | Lee | ............ | G01W 1/16 702/3 |
| 2015/0168560 A1* | 6/2015 | Ralphs | ............ | G01S 19/35 701/23 |
| 2015/0192670 A1* | 7/2015 | Jo | ............ | G01S 13/951 702/190 |
| 2015/0323386 A1* | 11/2015 | Hoeffner | ............ | G01J 3/4412 356/451 |
| 2019/0044734 A1* | 2/2019 | Lancashire | ............ | G06Q 20/401 |

OTHER PUBLICATIONS

Miles D. Cranmer, Benjamin R. Barsdell, Danny C. Price, Jayce Dowell, Hugh Garsden, Veronica Dike, Tarraneh Eftekhari, Alexander M. Hegedus, Joseph Malins, Kenneth S. Obenberger, Frank Schinzel, Kevin Stovall, Gregory B. Taylor, Lincoln J. Greenhill, "Bifrost: a Python/C++ Framework for High-Throughput Stream Processing in Astronomy," American Astronomical Society, AAS Meeting #229, Jan. 2017.

S. A. Cummer, U. S. Inan, T. F. Bell, "Ionospheric D region remote sensing using VLF radio atmospherics," Radio Science, vol. 33, Issue 6, 1998, pp. 1781-1792.

S. W. Ellingson, G. B. Taylor, J. Craig, J. Hartman, J. Dowell, C. N. Wolfe, T. E. Clarke, B. C. Hicks, N. E. Kassim, P. S. Ray, L. J. Rickard, F. K. Schinzel, K. W. Weiler, "The LWA1 Radio Telescope," IEEE Trans. Antennas & Propagation, vol. 61, No. 5, May 2013, pp. 2540-2549.

R. Jacobson, A & Holzworth, Robert & Shao, Xuan-Min. (2008). Low-frequency ionospheric sounding with Narrow Bipolar Event lightning radio emissions: Energy-reflectivity spectrum. Annales Geophysicae. 26. 10.5194/angeo-26-1793-2008.

Reinisch, Bodo & X Q, Huang. (1983). Automatic calculation of electron density profiles from digital ionograms. III—Processing of bottomside ionograms. Radio Science—Radio Sci. 18. 477-492.

Rhodes, Charley & Shao, Xuan-Min & Krehbiel, Paul & Thomas, Ronald & O. Hayenga, C. (1994). Observation of lightning phenomena using radio interferometry. Journal of Geophysical Research. 99. 13059-13082.

Shao, Xuan-Min & N. Holden, D & Rhodes, Charley. (1996). Broad band radio interferometry for lightning observations. Geophysical Research Letters—Geophys Res Lett. 23. 1917-1920.

Reinisch, Bodo & Galkin, Ivan & M. Khmyrov, Grigori & Kozlov, Alexander & A. Lisysyan, Igor & Bibl, Klaus & Cheney, George & Kitrosser, David & Stelmash, Stephen & Roche, Kevin & Luo, Yan & V. Paznukhov, Vadym & Hamel, Ryan. (2008). Advancing digisonde technology: The DPS-4D. AIP Conference Proceedings. 974. 127-143.

\* cited by examiner

RECEIVE ONLY IONOSONDE USING BROADBAND EMISSIONS AS SIGNALS OF OPPORTUNITY

CROSS-REFERENCE TO RELATED APPLICATIONS

This application claims the benefit of U.S. Provisional Application No. 62/669,701 filed on May 10, 2018, the entire content of which is hereby incorporated by reference.

STATEMENT OF GOVERNMENT INTEREST

The invention described herein may be manufactured, used, and licensed by or for the Government of the United States for all governmental purposes without the payment of any royalty.

BACKGROUND

Real-time, localized specification of the bottom of the ionosphere is employed to characterize the propagation of radio waves used in radio communication and radar systems. Ionograms, which describe electron density as a function of height, are traditionally produced by ionosondes. An ionosonde operates by first transmitting signals that step through the medium frequency (MF) and high frequency (HF) band (usually 1-25 MHz) and then listening for dispersed echoes. The group time delay between the emitted and return signals, as a function of frequency, is used to determine the "virtual height" of the ionospheric reflections. A complete series of virtual heights can be integrated to calculate electron density as a function of true height up to the altitude of the ionospheric density peak, after which the waves penetrate the ionosphere and no longer reflect back to the surface. The measurement of virtual height as a function of frequency is called an ionogram.

While ionosondes are the current standard for observing the bottom of the ionosphere, the required real estate, power, and frequency allocation to enable their operation makes them costly to deploy and maintain. Implementing such systems in many regions of the world is a difficult, if not impossible, endeavor. Furthermore, a single ionosonde is only capable of probing the ionosphere directly above it, and therefore misses spatial structure, such as traveling ionospheric disturbances (TIDs).

It is well known that a single stroke of lightning is capable of producing hundreds of extremely powerful wideband radio bursts on 1 µs timescales. Such wideband radio bursts (broadband emissions) are due to the stepped leader breakdown of air into an ionized channel for current to flow. Since all HF/very high frequency (VHF) frequencies are emitted at the same time at the source, a passive receiver can detect the ionospheric reflection which will see the frequency/time dispersion imparted by the ionosphere. The received pulse would appear very similar to the data processed by an ionosonde.

In view of the above, it would be advantageous to provide a receive-only method for specifying the electron density of the bottom of the ionosphere using powerful broadband emission (radio) sources that produce a temporal structure on a short enough timescale to resolve km scale density gradients.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Specific embodiments of the disclosure will now be described in detail with reference to the accompanying figures. While this disclosure is susceptible of being embodied in many different forms, there is shown in the drawings and will herein be described in detail specific embodiments, with the understanding that the present disclosure is to be considered as an example of the principles of the disclosure and not intended to limit the disclosure to the specific embodiments shown and described. In the description below, like reference numerals may be used to describe the same, similar or corresponding parts in the several views of the drawings.

All documents mentioned herein are hereby incorporated by reference in their entirety. References to items in the singular should be understood to include items in the plural, and vice versa, unless explicitly stated otherwise or clear from the text.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In accordance with an embodiment of the present disclosure, there is provided a method of examining the ionosphere. The method includes capturing, at one or more antennas, RF emissions preceding a broadband emission event. The RF emissions are then recorded at one or more broadband receivers over a period of time. A first tuning of the received RF emissions is selected to detect ionospheric reflections, and a second tuning of the received RF emissions is selected to detect direct line of sight emissions. From the selected tunings, an amplitude or complex time series of the second tuning and one or more channels of the first tuning are correlated to calculate a relative virtual echo height of the ionosphere.

In accordance with a further embodiment, the method further includes collapsing a plurality of time series into a single frequency dependent delay.

In accordance with yet another embodiment, the method further includes calculating the true virtual echo height based on the timing of at least one single hop echo from the broadband emission event to the one or more broadband receivers, and the timing of at least one double hop echo from the lightening event to one or more receivers. A true virtual echo height $h_v$ can be represented by:

$$h_v = \frac{c}{2}\left[\tau_1 + \frac{(4\tau_1^2 - \tau_2^2)}{2\tau_2 - 8\tau_1}\right]$$

where, $h_v$ is the virtual height of the ionosphere, c is the speed of light, $\tau_1$ is the delay of the single hop and $\tau_2$ is the delay of the double hop.

In accordance with a further embodiment, the one or more broadband receivers are operable in HF/VHF frequency bands. The broadband emission event may be produced by lightening, a power plant, a wind farm, or any other source capable of generating broadband emissions.

In accordance with another embodiment of the present disclosure, there is provided a method of examining the ionosphere. The method includes: capturing, at one or more antennas, radio frequency (RF) emissions preceding a broadband emission event; recording the RF emissions at one or more broadband receivers over a period of time; selecting a tuning of the received RF emissions to detect direct line of sight emissions and ionospheric reflections; and auto correlating the amplitude or complex time series of a channel or channels of the tuning to calculate a relative virtual echo height of the ionosphere.

In accordance with yet another embodiment, the method includes capturing, at one or more antennas, radio frequency (RF) emissions preceding a broadband emission event; recording the RF emissions at one or more broadband receivers over a period of time; selecting a tuning of the received RF emissions to detect ionospheric reflections; and cross correlating the amplitude or complex time series of a single channel with another channel or channels of the tuning to calculate a relative virtual echo height of the ionosphere.

In accordance with yet another embodiment of the present disclosure, there is provided a system for examining the ionosphere. Generally, the system includes one or more antennas operable to capture RF emissions preceding a broadband emission event, and one or more broadband receivers coupled to the one or more antennas. At least one processor is operable to record the RF emissions at the one or more broadband receivers over a period of time. The processor is further operable to: select a first tuning of the received RF emissions to detect ionospheric reflections; select a second tuning of the received RF emissions to detect direct line of sight emissions; and correlate an amplitude or complex time series of the second tuning with one or more channels of the first tuning to calculate a relative virtual echo height of the ionosphere.

In accordance with yet another embodiment of the present disclosure, there is provided a computer program product composed of a non-transitory computer usable storage medium storing computer usable program code for examining the ionosphere. The computer program product includes: computer usable program code, which when executed by at least one processor, causes the processor to record the RF emissions preceding a broadband emission event and received at one or more antennas and at one or more broadband receivers, over a period of time; computer usable program code, which when executed by at least one processor, causes the processor to select a first tuning of the received RF emissions to detect ionospheric reflections; computer usable program code, which when executed by at least one processor, causes the processor to select a second tuning of the received RF emissions to detect direct line of sight emissions; and computer usable program code, which when executed by at least one processor, causes the processor to correlate an amplitude or complex time series of the second tuning with one or more channels of the first tuning to calculate a relative virtual echo height of the ionosphere.

As will be appreciated by those skilled in the art, for vertical soundings of the ionosphere, the local plasma frequency sets the maximum transmitted frequency at a given altitude. All frequencies below the plasma frequency will be reflected back to earth, and the plasma frequency is proportional to $\sqrt{n_e}$, where $n_e$ is the electron density. A broad range of radio frequencies is necessary to probe the electron density profile of the stratified ionosphere. The range of electron densities for the bulk of the ionosphere are within the medium frequency (MF; 0.3-3 MHz) and high frequency (HF; 3-30 MHz) bands.

The ionosphere is broken up into three layers, which are known as the D (60-90 km), E (90-150 km), and F (150-500 km) layers, respectively. Generally speaking, the electron density of the ionosphere increases as a function of altitude, therefore, higher frequencies will be reflected at higher altitudes until the peak density in the F layer is reached at which point the electron density decreases. Above the F layer peak, no vertically transmitted signals are reflected back to earth. Furthermore, the F layer is often broken up into the F1 and F2 layers.

The group delay as a function of frequency for a sounding measurement, provides the information to reconstruct the electron density profile of the bottom of the ionosphere. The most important frequencies to measure are the peaks of the respective E, F1, and F2 layers (fofE, foF1, foF2). A group delay measurement of the ionosphere is called an ionogram.

In accordance with embodiments of the present disclosure, natural signals are utilized as HF sounders. One such emission source is lightning, which provides powerful, broadband radio emission at the necessary frequencies. The extremely powerful burst of radio emission is generated as the main bolt of current flows in a lightning stroke. The bulk of this emission occurs below the Low Frequency (LF) band (<300 kHz) and can be as powerful as a few gigawatts. Since D layer reflections require frequencies below <1 MHz, lightning is a preferred signal of opportunity.

While soundings of the D layer are best done below 1 MHz, the denser E and F layers typically require soundings in the HF and sometimes even very high frequency ranges (VHF; 30-300 MHz). The lightning RF emission from the main current flow is not powerful enough at these frequencies to be used efficiently as an ionospheric sounder. However, very powerful HF—VHF bursts occur during the initial breakdown of air that forms the ionized channel over which the main bolt of current can flow. This is done by the stepped extension of an ionized leader and precedes the LF radio emission. One leader is typically built by hundreds of steps, which often branch out into many directions. Each spark-like step produces a short (~10 μs) broadband pulse of RF in the HF and VHF bands.

For HF/VHF studies of the ionosphere, lightning is a large source of interference. For instance, when an ionosonde is sweeping through the HF spectrum, each burst of nearby lightning will produce a "source" at a spurious range, thus adding to the noise of a measurement. The ionosphere will thus impart the same dispersion signal onto a short broadband pulse as it does to an ionosonde sweep. Therefore, in accordance with embodiments of the present disclosure, a broadband receiver situated to detect both the direct line-of-sight and the ionospheric reflection of lightning can produce ionograms without the need for any transmissions.

Figure 1:
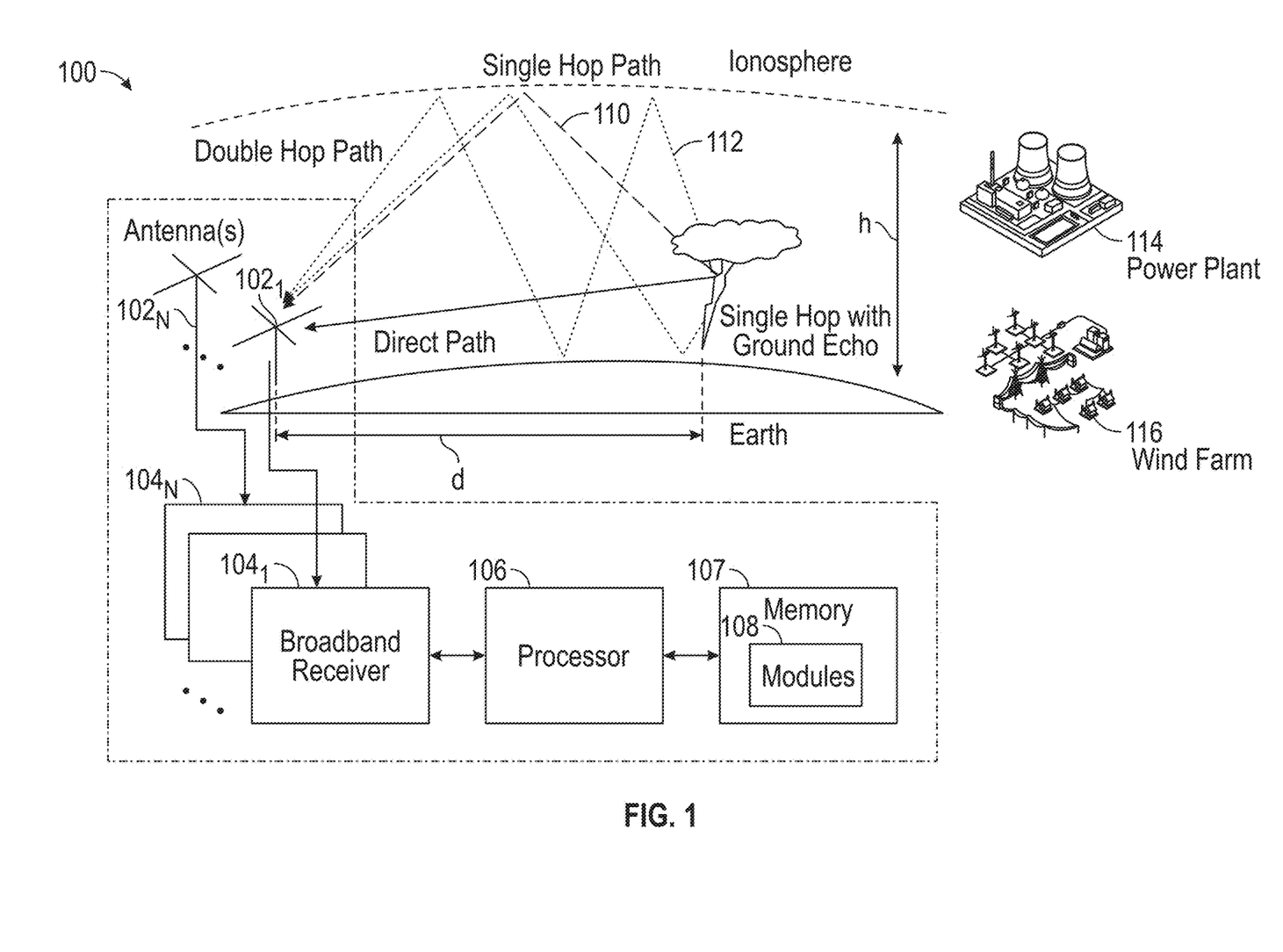
FIG. 1 is a high-level schematic diagram of a system for examining the ionosphere in accordance with an embodiment of the present disclosure.

FIG. 1 is a high-level schematic of a system 100 for examining the ionosphere in accordance with an embodiment of the present disclosure. The system 100 includes one or more antennas $102_1 \ldots 102_N$ operable to capture RF emissions preceding a broadband emission event generated by, for example, a lightning strike or emissions from a power plant 112, a windfarm 114, or the like. One or more broadband receivers $104_1 \ldots 104_N$ are coupled to the one or more antennas over a communications link. The broadband receivers $104_1 \ldots 104_N$ are operable in the HF/VHF (i.e., 3-300 MHz) frequency bands. The antenna(s) can include a digital recorder and may be deployed either as an array or as single elements. At least one processor 106 is operably coupled to and configured to record the RF emissions at the one or more broadband receivers $104_1 \ldots 104_N$ over a period of time. The processor 106 is coupled to a memory 107 having one or more modules 108 storing machine executable program instructions that, when executed by the processor, cause the processor to: select a first tuning of the received RF emissions to detect ionospheric reflections; select a second tuning of the received RF emissions to detect direct line of sight emissions; and correlate the amplitude time series of the second tuning with one or more channels of the first tuning to calculate a relative virtual echo height of the ionosphere. The calculations include collapsing a plurality of time series into a single frequency dependent delay. A true virtual echo height calculation is based on the timing of at least one single hop echo 110 from the broadband emission event to the one or more broadband receivers $104_1 \ldots 104_N$, and the timing of at least one double hop echo 112 from the lightening event to one or more receivers $104_1 \ldots 104_N$. The true virtual echo height $h_v$ is represented by:

$$h_v = \frac{c}{2}\left[\tau_1 + \frac{(4\tau_1^2 - \tau_2^2)}{2\tau_2 - 8\tau_1}\right]$$

where, $h_v$ is the virtual height of the ionosphere, c is the speed of light, $\tau_1$ is the delay of the single hop and $\tau_2$ is the delay of the double hop.

HF/VHF dipole antenna(s) are capable of capturing a wide spectrum of the RF emissions from the stepped leader process, which proceeds a broadband emission such as a lightning event. With extremely wide fields of view (nearly $2\pi$ sr), dipole antenna(s) can detect both the direct line of sight and the ionospheric reflection nearby lightning. While the direct line of sight will come in at all frequencies, the ionospheric reflection will only be detectable below the maximum usable frequency (MUF) of the ionosphere.

A single frequency band spanning the range from a few MHz up to above the ionospheric critical frequency is sufficient to determine the virtual height of ionospheric reflections and generate an ionogram. However, calibration can be simplified by using two frequency bands, one well above the MUF and one covering the frequency range below the MUF. Typical values for the MUF at middle latitudes are between 6 and 10 MHz, so a preferred tuning selection would be 3-13 MHz for the lower tuning, and 68-78 MHz for the upper tuning. Since the upper tuning is above the MUF, only radio emissions traveling along a direct line of sight will be detected (except for extremely oblique propagation of distant sources, ionospheric reflections are virtually impossible at such high frequencies). Accordingly, integrating across all frequencies of the upper tuning can be utilized to create a high signal to noise measurement of the timing and amplitudes of each pulse in the stepped leader process.

The lower tuning captures the ionospheric reflection and oftentimes the direct line of sight as well. The timing of the direct line of sight will be the same as the upper tuning, however, the timing of the ionospheric reflection is dependent on frequency. Therefore, it will be appreciated that each frequency channel of the lower tuning may contain two copies of the upper tuning signal, one that occurs at the same time (direct line of sight) and one that is delayed by an amount equal to the dispersion at the channel's frequency. The two amplitude time series coming from the direct line of sight and ionospheric reflection are very complicated and difficult to interpret on their own.

Figure 2:
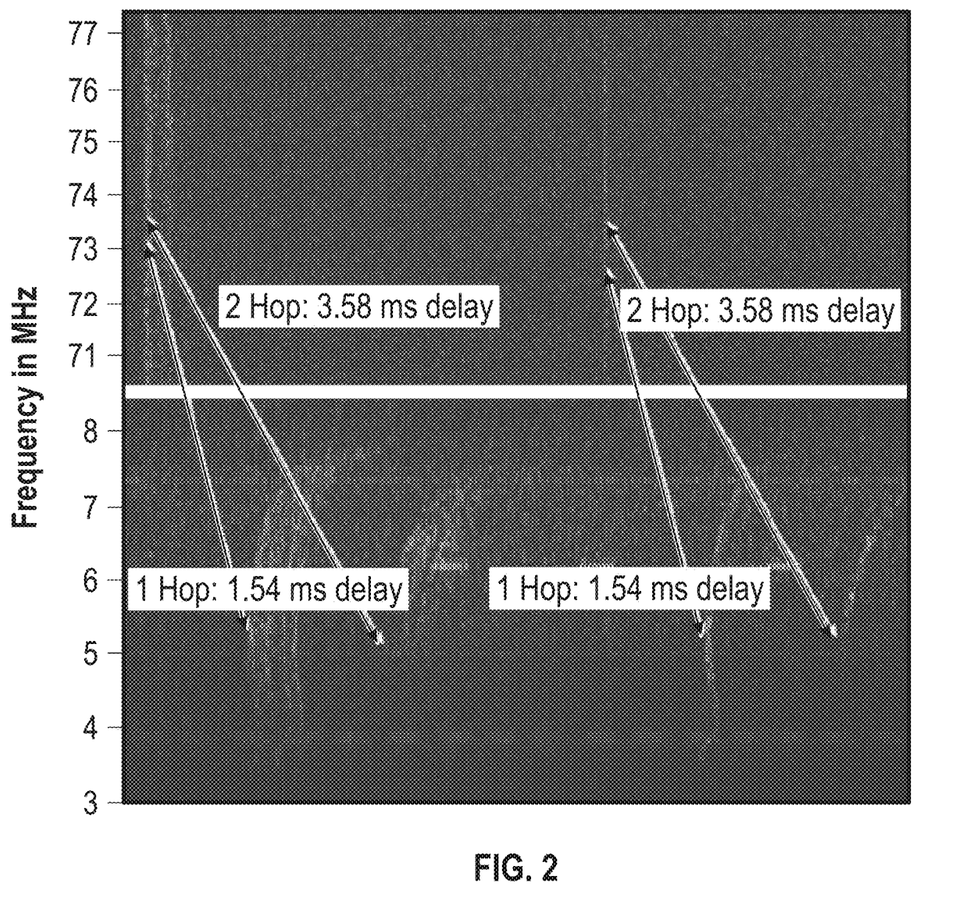
FIG. 2 represents several direct line of sight bursts with corresponding ionospheric reflections.
Figure 3:
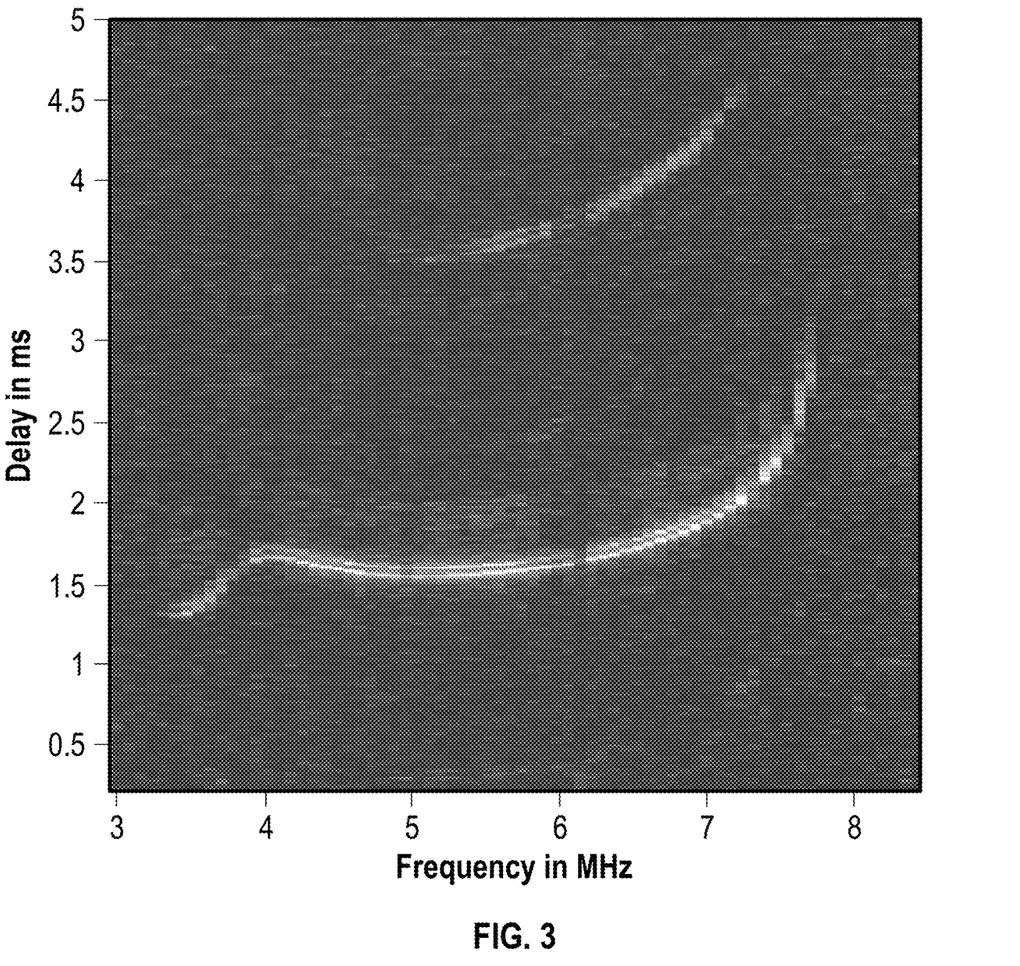
FIG. 3 shows the delay as a function of frequency, resulting from correlating the upper tuning averaged time series with each channel of the lower tuning (amplitudes only)

FIG. 2 is a graphical representation of several direct line of sight bursts with corresponding ionospheric reflections. It will be appreciated that the "smeared" nature of the bursts due to the fact that many are clustered together. These smeared time series are collapsed into a single frequency dependent delay by correlating the amplitude time series of the upper tuning with each channel of the lower tuning. The dynamic spectra of both the upper tuning (top) and lower tuning (bottom) are shown. The arrows connect the direct line-of-sight from the upper tuning with the observed single and double hop echoes. The lower tuning clearly shows the dispersive characteristics of the ionosphere. The result of the correlation dispersed sweep indicating the difference between the timing of the direct line of sight and the ionospheric reflection at each frequency as depicted in FIG. 3, which shows the delay as a function of frequency, resulting from correlating the upper tuning averaged time series with each channel of the lower tuning (amplitudes only). In the exemplary depiction, hundreds of bursts from a single lightning event were used to generate these delays. Both the single (~1.5 ms) and double (~3.8 ms) hop echoes are detected, as well as the closely spaced, parallel echoes resulting from the lightning and ground reflection.

This dispersed sweep is equivalent to an ionogram but without an absolute calibration for the virtual heights, which are accurate with respect to each other but not to the ground. The delay times corresponding to virtual heights do not indicate the total delay time of the ionospheric wave. Instead, they are the difference in delay time between the ionospheric wave and the direct line of sight wave. In order to create a true ionogram with absolute virtual heights from this data it is necessary to solve for the distance to the lightning event.

This can be done several ways. For instance, a group of antennas can be used which are separated by a few km to independently measure the timing of the direct line of sight. It is then simple geometry to triangulate the position of the lighting, and thereby derive the distance to the strike. Alternatively, and in accordance with an embodiment of the present disclosure as described above, it is possible to leverage the timing of the double hop echo in addition to the single hop echo. When radio waves are generated by the lightning they travel up to the ionosphere and reflect down to the receive antenna(s), this is a single hop reflection. Often, however the receive antenna(s) see another ionospheric reflection appearing sometime after the first. In this situation the RF waves travel from the lightning to the ionosphere, reflect to the ground, reflect back up to the ionosphere and finally reflect down to the receive antenna(s). If we approximate the ground and ionosphere as planar surfaces (reasonable only for nearby lightning and an undisturbed ionosphere), then the virtual height of the ionosphere is related to the timing of the single and double hop echoes through the equation described above.

Figure 4:
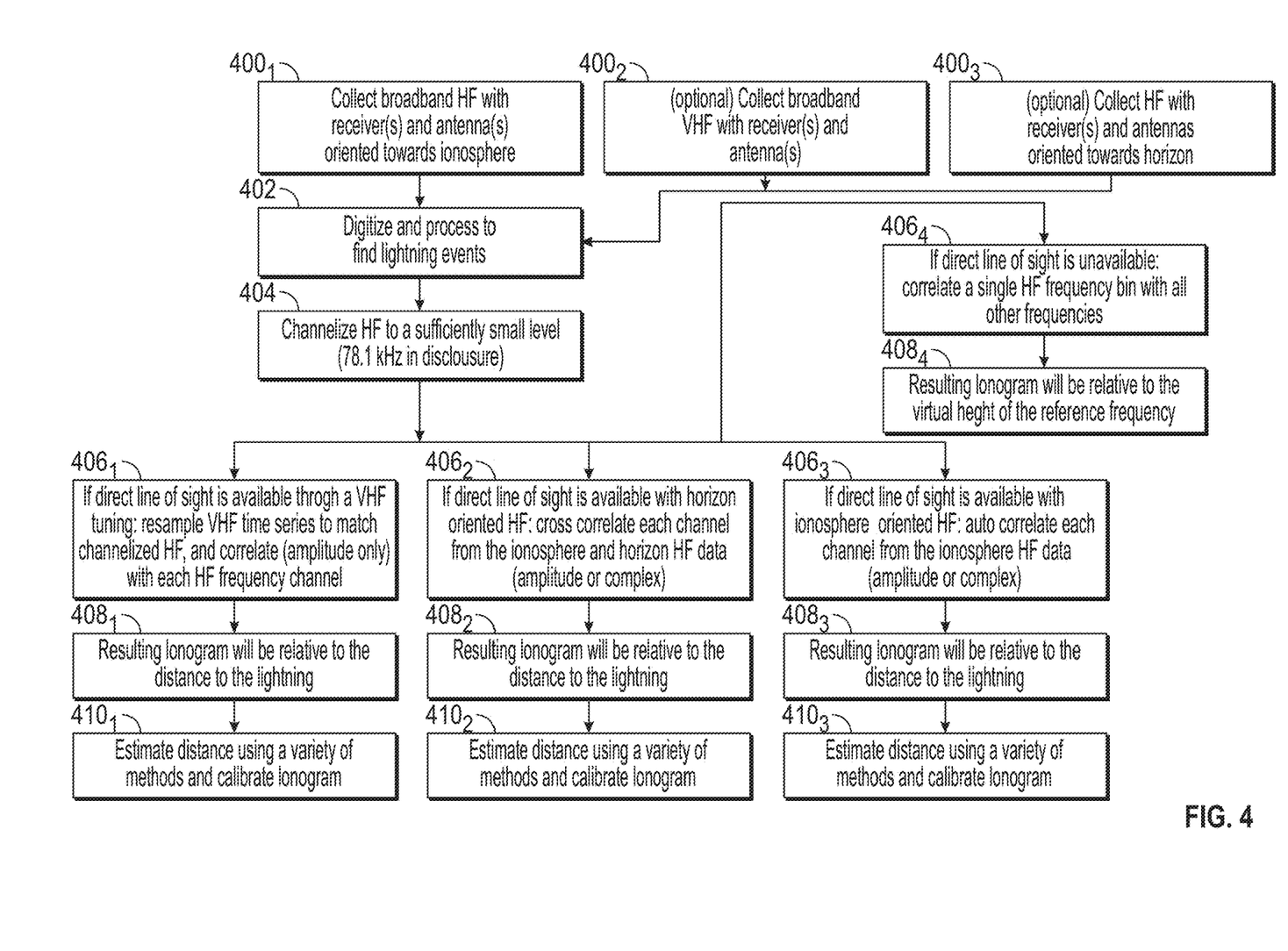
FIG. 4 is a flow-diagram of a method in accordance with an embodiment of the disclosure.

Referring now to FIG. 4, there is shown a flow-diagram of a method for examining the ionosphere in accordance with an embodiment of the present disclosure. In block $400_1$, the method proceeds with the collection of broadband HF emissions via the broadband receivers $104_1 \ldots 104_N$ coupled to antennas $102_1 \ldots 102_N$ oriented towards the ionosphere. Block $400_2$ represents an alternate step for VHF signals, and block $400_3$ shows an expedient where the antennas are pointed towards the horizon. In block 402, the received data is digitized and processed to find lightening events. In block 404, the method channelizes the HF emissions to sufficiently small level (e.g., 78 kHz). The process then proceeds to blocks $406_1$ through $406_4$, each of which represents an alternative condition. In block $406_1$, if a direct line of sight is available through a VHF tuning, then resample the VHF time series to match the channelized HF, and correlate (amplitude only) with each HF frequency channel. Alternatively, in block $406_1$, if a direct line of sight is available with the horizon-oriented HF, then cross-correlate each channel from the ionosphere and horizon HF data (amplitude or complex). In block $406_3$, of a direct line of sight is available with the ionosphere-oriented HF, then auto-correlate each channel from the ionosphere HF data (amplitude or complex). Alternatively, in block $406_4$, if a direct line of sight is unavailable, then correlate a single HF frequency bin with all other frequencies and the resulting ionogram will be relative to the virtual height of the reference frequency in block 408. For blocks $406_1$, $406_2$, and $406_3$, the resulting ionogram (blocks $408_1$, $408_2$, and $408_3$, respectively) will be relative to the distance of the broadband emission event (i.e., lightening). In blocks $408_1$, $408_2$, and $408_3$, respectively, the distance is then estimated and the ionogram is calibrated in accordance with the above description.

The terms "program," "module(s)," "software application," and the like, as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The present disclosure may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Embodiments of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform embodiments of the present disclosure.

It will be appreciated that the devices, systems, and methods disclosed in accordance with embodiments of the disclosure are set forth by way of example and not of limitation. Absent an explicit indication to the contrary, the disclosed devices, systems, and method steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

It will be understood by those skilled in the art that various changes may be made in the form and details of the described embodiments resulting in equivalent embodiments that remain within the scope of the appended claims.

What is claimed is:

1. A method of examining the ionosphere, the method comprising:
   capturing, at one or more antennas, radio frequency (RF) emissions preceding a broadband emission event;
   recording the RF emissions at one or more broadband receivers over a period of time before and during a broadband emission event;
   selecting a first tuning of the received RF emissions to detect ionospheric reflections for a broadband emission event not originating from an ionosonde;
   selecting a second tuning of the received RF emissions to detect direct line of sight emissions for the broadband emission event; and
   correlating an amplitude or complex time series of the second tuning with one or more channels of the first tuning to calculate a relative virtual echo height of the ionosphere.

2. The method of claim 1, further comprising collapsing a plurality of time series into a single frequency dependent delay.

3. The method of claim 1 wherein the broadband emission event is a lightning event having both at least one single hop echo and at least one double hop echo recorded, further comprising calculating the true virtual echo height based on the timing of the at least one single hop echo from the lightning event to the one or more broadband receivers, and the timing of the at least one double hop echo from the lightning event to one or more receivers.

4. The method of claim 3, where the true virtual echo height $h_v$ is represented by:

$$h_v = \frac{c}{2}\left[\tau_1 + \frac{(4\tau_1^2 - \tau_2^2)}{2\tau_2 - 8\tau_1}\right]$$

where, $h_v$ is the virtual height of the ionosphere, c is the speed of light, $\tau_1$ is the delay of the single hop and $\tau_2$ is the delay of the double hop.

5. The method of claim 1, where the one or more broadband receivers are operable in high frequency/very high frequency bands.

6. The method of claim 1, where the broadband emission event is produced by lightning.

7. The method of claim 1, where the broadband emission event is produced by a power plant.

8. The method of claim 1, where the broadband emission event is produced by a wind farm.

9. A system for examining the ionosphere, the system comprising:
   one or more antennas operable to capture radio frequency (RF) emissions preceding a broadband emission event;
   one or more broadband receivers coupled to the one or more antennas;
   at least one processor operable to record the RF emissions at the one or more broadband receivers over a period of time before and during a broadband emission event;
   the processor further operable to:
      select a first tuning of the received RF emissions to detect ionospheric reflections for a broadband emission event not originating from an ionosonde;
      select a second tuning of the received RF emissions to detect direct line of sight emissions for the broadband emission event; and
      correlate an amplitude or complex time series of the second tuning with a one or more channels of the first tuning to calculate a relative virtual echo height of the ionosphere.

10. The system of claim 9, where the processor is operable to collapse a plurality of time series into a single frequency dependent delay.

11. The system of claim 9 wherein the broadband emission event is a lightning event having both at least one single hop echo and at least one double hop echo recorded, where the processor is operable to calculate the true virtual echo height based on the timing of the at least one single hop echo from the lightning event to the one or more receivers, and the timing of the at least one double hop echo from the lightning event to the one or more receivers.

12. The system of claim 11, where the true virtual echo height $h_v$ represented by:

$$h_v = \frac{c}{2}\left[\tau_1 + \frac{(4\tau_1^2 - \tau_2^2)}{2\tau_2 - 8\tau_1}\right]$$

where, $h_v$ is the virtual height of the ionosphere, c is the speed of light, $\tau_1$ is the delay of the single hop and $\tau_2$ is the delay of the double hop.

13. The system of claim 9, where the one or more broadband receivers are operable in high frequency/very high frequency bands.

14. The system of claim 9, where the broadband emission event is produced by lightning.

15. The system of claim 9, where the broadband emission event is produced by a power plant.

16. The method of claim 9, where the broadband emission event is produced by a wind farm.

17. A computer program product comprising a non-transitory computer usable storage medium storing computer usable program code for examining the ionosphere, the computer program product comprising:

computer usable program code, which when executed by at least one processor, causes the processor to record radio frequency (RF) emissions preceding and during a broadband emission event not originating from an ionosonde and received at one or more antennas and at one or more broadband receivers, over a period of time;

computer usable program code, which when executed by at least one processor and upon a broadband emission event, causes the processor to select a first tuning of the received RF emissions to detect ionospheric reflections;

computer usable program code, which when executed by at least one processor and upon the broadband emission event, causes the processor to select a second tuning of the received RF emissions to detect direct line of sight emissions; and computer usable program code, which when executed by at least one processor, causes the processor to correlate an amplitude or complex time series of the second tuning with a one or more channels of the first tuning to calculate a relative virtual echo height of the ionosphere.

18. The computer program product of claim 17, further comprising computer usable program code, which when executed by the processor, causes the processor to collapse a plurality of time series into a single frequency dependent delay.

19. The computer program product of claim 17 wherein the broadband emission event is a lightning event having both at least one single hop echo and at least one double hop echo recorded, further comprising computer usable program code, which when executed by the processor, causes the processor to calculate the true virtual echo height based on the timing of the at least one single hop echo from the lightning event to the one or more receivers, and the timing of the at least one double hop echo from the lightning event to the one or more receivers.

20. The computer program product of claim 19, where the true virtual echo height $h_v$ is represented by:

$$h_v = \frac{c}{2}\left[\tau_1 + \frac{(4\tau_1^2 - \tau_2^2)}{2\tau_2 - 8\tau_1}\right]$$

21. A method of examining the ionosphere, the method comprising:

capturing, at one or more antennas, radio frequency (RF) emissions preceding a broadband emission event;

recording the RF emissions at one or more broadband receivers over a period of time before and during a broadband emission event not originating from an ionosonde;

upon the broadband emission event, selecting a tuning of the received RF emissions to detect direct line of sight emissions and ionospheric reflections; and auto correlating the amplitude or complex time series of a channel or channels of the tuning to calculate a relative virtual echo height of the ionosphere.

22. A method of examining the ionosphere, the method comprising:

capturing, at one or more antennas, radio frequency (RF) emissions preceding a broadband emission event;

recording the RF emissions at one or more broadband receivers over a period of time before and during a broadband emission event not originating from an ionosonde;

upon the broadband emission event, selecting a tuning of the received RF emissions to detect ionospheric reflections; and cross correlating the amplitude or complex time series of a single channel with another channel or channels of the tuning to calculate a relative virtual echo height of the ionosphere.

\* \* \* \* \*